United States Patent [19]

Tanaka

[11] Patent Number: 4,541,086

[45] Date of Patent: Sep. 10, 1985

[54] DISC CLAMPING MECHANISM

[75] Inventor: Kenji Tanaka, Saitama, Japan

[73] Assignee: Pioneer Electronic Corporation, Tokyo, Japan

[21] Appl. No.: 638,136

[22] Filed: Aug. 6, 1984

[30] Foreign Application Priority Data

Aug. 8, 1983 [JP] Japan .................. 58-123187[U]
Aug. 8, 1983 [JP] Japan .................. 58-123188[U]

[51] Int. Cl.³ .................. G11B 3/00; G11B 3/62; G11B 17/00
[52] U.S. Cl. .................. 369/271; 369/270
[58] Field of Search .................. 369/270, 271

[56] References Cited

U.S. PATENT DOCUMENTS

| | | | |
|---|---|---|---|
| 3,436,082 | 4/1969 | Bostrom et al. | 369/270 |
| 3,561,768 | 2/1971 | Castagna | 369/270 |
| 4,340,955 | 7/1982 | Elliott | 369/270 |
| 4,347,599 | 8/1982 | Vitale | 369/270 |
| 4,376,997 | 3/1983 | Eggers | 369/270 |
| 4,489,410 | 12/1984 | Yamaguchi et al. | 369/270 |

Primary Examiner—Steven L. Stephan
Attorney, Agent, or Firm—Sughrue, Mion, Zinn, Macpeak, and Seas

[57] ABSTRACT

A disc mounting mechanism capable of mounting first and second discs having different center hole diameters to a rotated shaft is disclosed. First and second turntables are mounted concentrically on the rotated shaft for rotation with the rotated shaft, the turntables being concentric with respect to one another with the first turntable surrounding the second turntable. A first disc locating member has first and second cylindrical portions having outer diameters corresponding to diameters of the center holes in first and second discs, with the first cylindrical portion being located between the first and second turntables and the second cylindrical portion being inside the second turntable. The first disc locating member is slidable axially with respect to the first and second turntables parallel to the rotated shaft. First and second clamping members clamp the first and second discs to the first and second turntables, respectively, the first and second clamping members being slidably mounted on the rotated shaft. The first clamping member depresses the first disc locating member to move the first cylindrical portion below a surface of the first disc when the first disc is clamped to the first turntable by the first clamping member.

13 Claims, 14 Drawing Figures

DISC CLAMPING MECHANISM

BACKGROUND OF THE INVENTION

The present invention relates to a mechanism for rotatably fixing a disc to a rotary driving spindle for recording information on the disc or reproducing information previously recorded on the disc. Discs of this type include ordinary phonograph records, digitally recorded phonograph records, and video discs. The invention relates more particularly to a mechanism for fixing discs, especially discs which must be rotated at high speed, to a driving spindle, which mechanism is capable of accommodating discs having different center hole diameters.

It is possible to reproduce information from both a digitally recorded audio disc and a digitally recorded video disc using the same basic playback apparatus (of course using different demodulators). However, most conventional disc playing apparatuses are not capable of selectively mounting an audio disc or a video disc on the same spindle because the two different types of discs have significantly different center hole diameters.

In Japanese Utility Model Publication No. 180713/79 there is disclosed a disc clamping mechanism which can accommodate discs of different diameters. However, if the diameter of the disc being played deviates even slightly from one of the specified diameters, the disc will not being firmly attached to the spindle, making its reproduction flawed.

Another problem of the prior art disc clamping mechanisms arises in playing double-sided video discs. In manufacture, these discs are ordinarily formed by bonding together two prerecorded sides. It is difficult to perform this operation with such an accuracy that the tracks on both sides are precisely centered around the center hole. Thus, even if the disc is clamped so that information on one side can be reproduced correctly, the track on the other side may be so far off center that accurate reproduction of the other side is impossible.

Still another problem is involved in the fact that on a compact optically and digitally recorded disc the innermost diameter of the recorded track is not much greater that the diameter of the center hole, that is the innermost portion of the recorded track is closely adjacent the edge of the center hole in the disc. This effectively limits the dimensions of the clamping mechanism, making it difficult to obtain an adequate clamping force with the available space between the edge of the center hole and the innermost recorded track.

Figure 1:
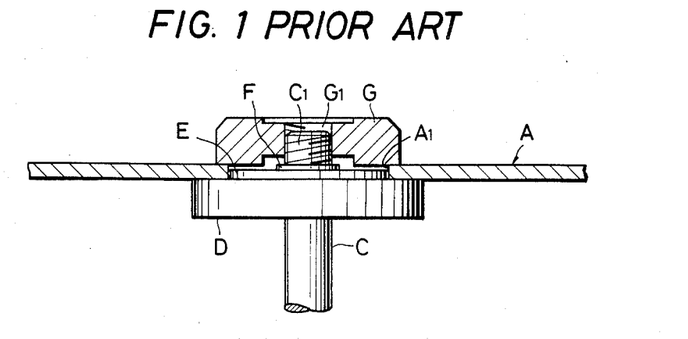
FIGS. 1 and 2 are side views, with portions in cross section, showing conventional disc mounting mechanisms.
Figure 2:
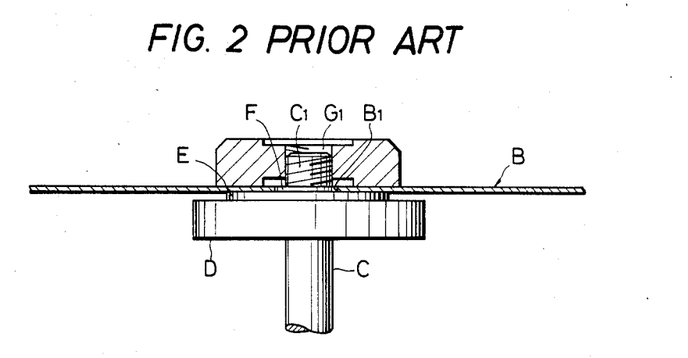

Prior art clamping mechanisms are shown in FIGS. 1 and 2 of the accompanying drawings. In these figures, A indicates a disc of a first thickness and center hole diameter (FIG. 1); $A_1$, the center hole of the disc A; B, a disc of a second thickness less than the thickness of the disc A and center hole diameter less than the center hole diameter of the disc A; $B_1$, the center hole of the disc B; and C, a spindle which is rotated by a motor (not shown). A turntable D, fixed to the spindle C, is provided at its center with bosses E and D, corresponding in outer diameters to the diameters of the center holes $A_1$ and $B_1$, respectively. The height of the boss E is equal to the difference in thickness between the discs A and B. An upward extension of the spindle C is threaded, and a clamper G is threadedly engaged with the threaded extension of the spindle C to clamp the disc between the clamper G and the turntable D. To mount a disc, the disc is placed on the turntable around the appropriate boss, and the clamper G is screwed onto the threaded extension of the spindle C.

If, as mentioned above, the center hole diameter of a disc being played does not precisely match the diameter of one of the bosses E and F, it is impossible always ensure that the disc is mounted on the turntable properly centered. Moreover, if it is desired to play a double-sided optical disc, frequently it is necessary to provide a separate centering member to center the tracks on the two sides of the disc. This makes the mounting of the disc complicated and time consuming. Hence, the mechanism is not suitable for use with video discs which require precise tracking.

SUMMARY OF THE INVENTION

Accordingly, it is an object of the present invention to provide a clamping mechanism for a recorded information disc in which the above-discussed disadvantages are eliminated.

The above and other objects of the present invention are met by a disc mounting mechanism capable of mounting first and second discs having different center hole diameters to a rotated shaft, the diameter of the center hole of the first disc being greater than the diameter of the center hole of the second disc, comprising first and second turntables mounted concentrically on the rotated shaft for rotation with the rotated shaft, the turntables being concentric with respect to one another with the first turntable surrounding the second turntable; first disc locating means having first and second cylindrical portions having outer diameters corresponding to the center hole diameters of the first and second discs, the first cylindrical portion being located between the first and second turntables and the second cylindrical portion being inside the second turntable, and the first disc locating member being slidable axially with respect to the first and second turntables parallel to the rotated shaft; and first and second clamping members for clamping the first and second discs to the first and second turntables, respectively, the first and second clamping members being slidably mounted on the rotated shaft, the first clamping member comprising means for depressing the first disc locating means to move the upper side of the first cylindrical portion below a surface of the first disc when the first disc is clamped to the first turntable by the first clamping member.

DESCRIPTION OF THE PREFERRED EMBODIMENTS

Figure 3:
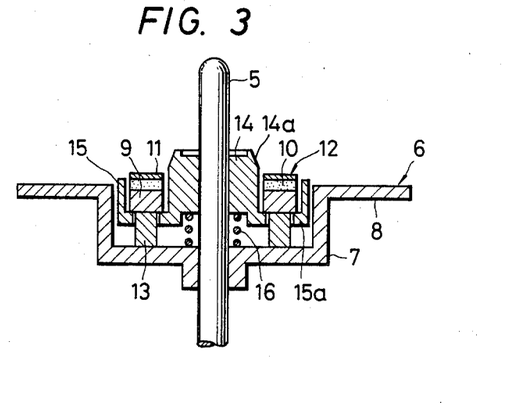
FIGS. 3, 4 and 5 are cross-sectional views showing various components of a disc mounting mechanism according to the present invention.

A first preferred embodiment of the invention will now be described with reference to FIG. 3 of the accompanying drawings. In FIG. 3, reference numeral 1 designates a first disc, which may be a video disc or the like, having a center hole having a diameter of, for example 15 mm; 5, a spindle rotated by a motor (not shown); and 6, a first turntable fixed to the spindle. The first turntable 6 has a bottomed lower cylindrical portion 7 and a support 8 in the form of a flange extending from the upper edge of the cylindrical portion 7. The inside diameter of the cylindrical portion 7 is slightly less than the center hole diameter of the center hole 2 of the first disc 1.

A second turntable 12 is positioned inside the cylindrical portion 7 of the first turntable 6. The second turntable 12 is composed of an annularly shaped cylindrical yoke 9, magnet 10, and rubber washer 11, stacked in the mentioned order, separated from the bottom of the cylindrical portion 7 by a spacer 13, and positioned concentrically with respect to the spindle 5 and the first turntable 6. The inside diameter of the magnet 10 is slightly greater than the diameter of the second disc 3, while the top of the rubber washer projects beyond the top of the first turntable 6, that is, beyond the top of the support 8, by a distance corresponding to the difference in thicknesses between the first and second discs 1 and 3, respectively. Inside the magnet 10 is provided a second disc locating member 14, which is fitted into the center hole 4 of the second disc 3 and which is journaled to the spindle 5 for up and down movement relative thereto.

The upper portion of the second disc locating member 14 is configured in a frusto-conical form and includes an inclined surface 14a against which the edge of the center hole 4 of the second disc abuts. Reference numeral 15 indicates a cylindrical hub disposed between the inner peripheral wall of the bottomed cylindrical portion 7 and the spacer 13 and positioned coaxially of the rotary shaft 5. The lower end of the hub 15 is integrally connected with the second disc locating member 14 by connectors 15a passing through holes formed in the spacer 13 and moves up and down with the second disc locating member 14. The outer diameter of the center hub 15 is slightly smaller than the diameter of the center hole 2 in the first disc 1. The periphery of the center hub 15 at its upper end is tapered so as to facilitate its insertion into the center hole 2.

Reference numeral 16 denotes a compressive spring located between the base of the second disc locating member 14 and the bottom of the bottom cylindrical portion 7. The top of the second disc locating member 14 is urged by the spring 16 as to extend upwards beyond the top of the rubber washer 11. In this state, the top of the center hub 15 is flush with the top of the rubber washer 11. Upward movement of the center hub 15 is stopped by abutment of the connectors 15a against the base of the yoke 9.

Figure 4:
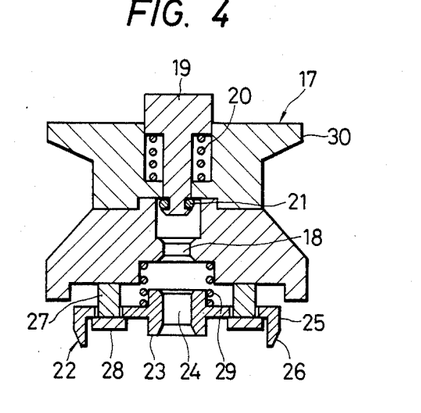

Reference numeral 17 is a clamper, used solely for the first disc 1, which includes a spindle formed with an axial hole 18 in which the spindle 5 is inserted. A button 19 arranged upwardly of the axial hole 18 is movable up and down and is upwardly energized by a spring 20. The button is prevented from being upwardly removed by a stop 21 in ring form.

A first disc locating member 22 is disposed on the base of the clamper 17 so as to be freely insertable into the center hole 2 of the first disc 1. The first disc locating member 22 is provided at its center with a spindle sleeve 23, which is formed at its center with an axial hole 24 to receive therein the spindle 5. The first disc locating member 22 is formed at its periphery with a cylindrical portion 25 insertable into the center hole 2 of the first disc 1. The cylindrical portion 25 includes a peripheral surface 26 which is tapered toward its lower part, against which the side center hole 2 abuts. The first disc locating member 22 is supported by spacers 27 which extend from the bottom of the clamper 17 and which guide the up and down movement of the member 22. The member 22 is prevented from being removed by an annular magnetic body 28 mounted at the lower end of the spacers 27. The first disc locating member 22 is energized downwardly by a spring 29. Reference numeral 30 is a thumb segment formed peripherally of the clamper 17 at its upper end.

Figure 5:
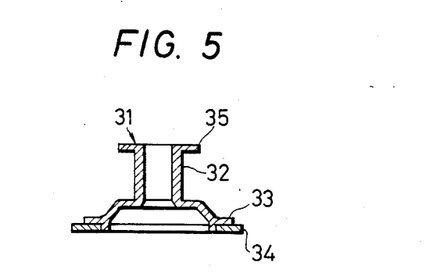

Reference numeral 31 is a clamper used solely for the second disc 3. The clamper 31 includes a spindle sleeve 32 in which the rotary shaft 5 is inserted, a flange 33 formed downwardly of the spindle sleeve 32, and a magnetic plate 34 fixed to the bottom of the flange 33. A thumb segment 35 is formed peripherally of the spindle sleeve 32 at its upper end. The magnetic plate 34 is located in a position corresponding to the magnet 10.

Operation of the instant embodiment will be described hereinafter. For mounting the first disc 1 on the first turntable 6 by use of the clamper 17 exclusively used for the first disc 1, the first disc 1 is placed on the support 8 of the turntable 6 by slipping the center hole 2 on the center hub 15 of the first turntable 6. On the other hand, before mounting, the first disc locating member 22 of the clamper 17 is lowered by the spring 29 as shown in FIG. 4. Then, the clamper 17 is held by the operator to insert the spindle 5 in the hole 24 in the spindle sleeve and in the hole 18 in the clamper 17. At this moment, the peripheral surface 26 of the cylindrical portion 25 is fitted into and abutted against the center hole 2 in the first disc 1 to forcibly contact the support 8 of the first turntable 6. Further depression of the clamper 17 presses the magnetic body 28 against the magnet 9 where it is held. The magnetic body 28 is then in abutment with the rubber washer 11, thereby making the clamper 17 stationary. On the other hand, the spindle sleeve 23 downwardly urges the first disc locating member 22 against the springs 16 and 29 to separate the center hub 15 from the center hole 2 of the first disc. The attractive force of the magnet 10 is greater than the restoring forces of the springs 16 and 29 so that the clamper 17 is made stationary, whereby the first disc 1 is made to forcibly contact the support 8 by the elastic force of the spring 29.

For demounting the first disc 1 from the first turntable 8, the thumb segment 30 of the clamper 17 is held between the operator's fingers and at the same time the operator's thumb is applied to the top of the button 19 to depress the button against the spring 20 while pulling up the clamper 17 against the attractive force of the magnet 10. When the bottom of the button 19 abuts against the upper end of the spindle 5, the clamper 17 is readily pulled up. Then, the clamper 17 is drawn from the spindle 5 to freely remove the first disc 1.

The second disc 3 is mounted on the second turntable 12 by use of the clamper 31 used solely for the second disc 3. The center bore 4 of the second disc 3 is slipped on the second disc locating member 14 to abut against the inclined surface 14a. Then, the clamper 31 is held by the operator to slip the spindle sleeve 32 over the rotary shaft 5 and to push it downwardly until the magnetic plate 34 is attracted by the magnet 10 of the second turntable 12. Consequently, the second disc locating member 14 and the center hub 15 are lowered against the elastic force of the spring 16 and the second disc 3 is held in position on the rubber washer 11, at which time the upper end of the center hub 15 is out of contact with the bottom of the second disc 3.

When it is desired to remove the second disc 3 from the second turntable 12, the thumb segment 35 of the clamper 31 is held between the operator's fingers and his thumb is applied to the upper end of the spindle 5 extending from the upper end of the spindle sleeve 32. The clamper 31 is then pulled so that he magnetic plate 34 is separated from the top of the second disc 3 against the attractive force of the magnet 10, thereby withdrawing the clamper 31 from around the spindle 5.

Figure 10:
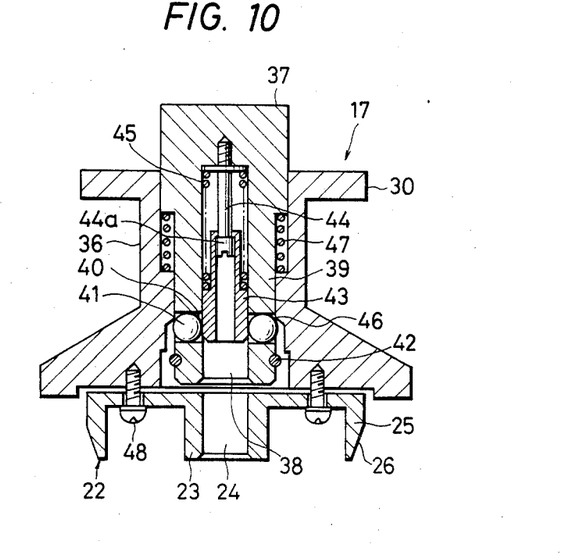
FIG. 10 is a cross-sectional view showing another embodiment of a disc mounting mechanism.
Figure 11:
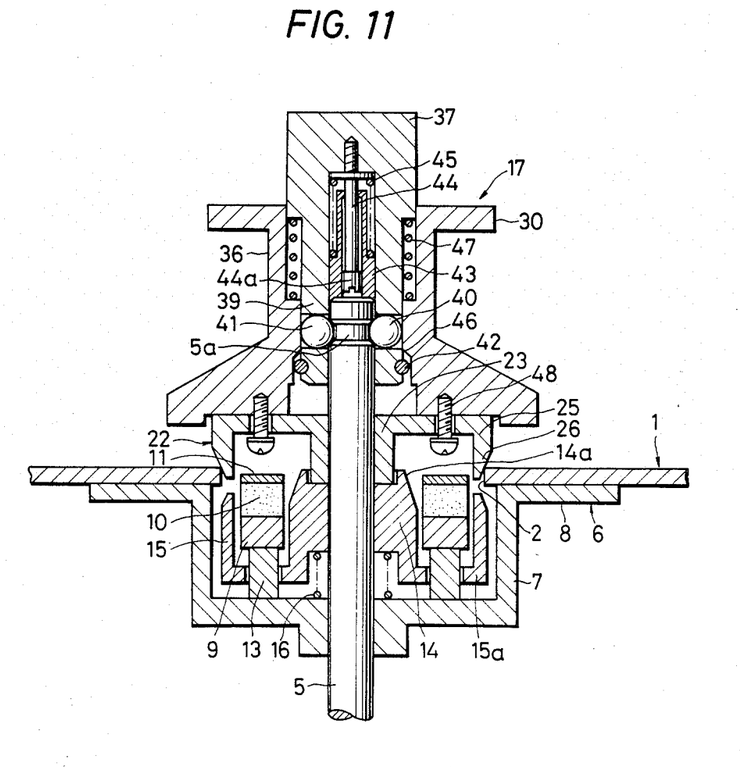
FIG. 11 is a cross-sectional view showing the manner in which a disc is mounted using the mechanism of FIG. 10.

FIG. 10 is a cross-sectional view showing another form of the clamper used solely for the first disc 1. FIG. 11 is a cross-sectional view showing the manner in which the clamper is used. In these figures, reference numeral 36 depicts a sleeve for the clamper 17, which is provided along its central axis with a movable member 37 disposed for its up and down movement. The movable member 37 has an axial hole 38 in which is received the spindle 5. The axial hole 38 is formed to a predetermined height. The movable member 37 is provided on its peripheral wall 39 adjacent the lower end with radially extending regularly spaced holes 40 communicating with the axial hole 38. Balls 41, each of diameter larger than the thickness of the peripheral wall 39, are horizontally movable in the holes 40. Mounted peripherally of the movable member 37 at its lower end is a resilient ring 42 made of rubber or the like for preventing the member 37 from slipping out of position. Reference numeral 43 designates a slide member which is disposed in the axial hole 38 for up and down movement. The slide member 43 has a lower perimeter of slightly smaller diameter than the axial hole 38. Reference numeral 44 is a screw having a head 44a in the axial hole in the slide member 43, a shaft which passes through the opening in the top of the slide member 43, and a shank threadedly joined to the movable member 37.

Reference numeral 45 is a compression spring with which the slide member 43 is downwardly energized to cause the lower portion of the slide member 43 to abut against the balls 41, forcing the same outwardly. Downward movement of the slide member 43 is stopped by the head 44a of the screw 44 abutting against the top of the slide member 43. The sleeve 36 is provided in the axial hole with a stop 46 in contact with the balls 41 and the ring 42. Reference numeral 47 is a compression spring interposed between the sleeve 36 and the movable member 37 to upwardly energize the movable member 37, preventing the latter from slipping out of position by engagement of the ring 42 with the stop 46. The first disc locating member 22 is attached by screws 48 to the boTtom of the sleeve 36 for up and down movement therewith. The spindle 5 is formed in this case at its upper end with an annular groove 5a peripherally thereof.

Similar to the first-described embodiment, the clamper 17 is held by the operator to insert the spindle 5 in the axial holes 38 and 24 in the movable member 37 and the first disc locating member 22, respectively, so that the upper end of the spindle 5 abuts against the bottom of the slide member 43. Then, depression of the sleeve 36 as shown in FIG. 11 forces down the slide members 43 against the elastic force of the spring 45 to release the lower end of the slide member 43 on the peripheral surface thereof from its compressive engagement with the balls 41. Further depression of the sleeve 36 removes the balls 41 from the stop 46 and causes them to abut against the inner peripheral surface of the sleeve 36 so that the balls 41 forcibly contact the annular groove 5a to lock the clamper 17 to the rotary shaft 5. The cylindrical portion 25 of the first disc locating member 22 disposed on the bottom of the clamper 17 is in turn fitted into the center hole 2 of the first disc 1 to cause the disc 1 to abut against the support 8 while the spindle sleeve 23 of the first disc locating member 22 depresses the second disc locating member 14 to separate the center hub 15 from the center hole 2 of the first disc 1.

The manner in which the first disc 1 is removed from the first turntable 6 will now be explained. The thumb segment 30 of the sleeve 36 is initially held between the operator's fingers and at the same time the operator's thumb is applied to the top of the movable member 37 to pull up the sleeve 36 against the elastic force of the spring 47. Then, the balls 41 are slid downwardly in the inner peripheral surface of the sleeve 36, reaching the position of the stop 46. This movement allows the balls 41 to move from the annular groove 5a of the rotary shaft 5, thereby releasing the latter from locked engagement with the movable member 37. The slide member 43 is lowered by the restoring force of the spring 45 until its lower periphery is abutted against the balls 41, thus urging the latter outwardly. On the other hand, the first disc locating member 22 of the clamper 17 is separated from the center hole 2 of the first disc 1, and at the same time the second disc locating member 14 and the center hub 15 are raised by the restoring force of the spring as they are released from compressive engagement with the first disc locating member 22. This action lifts the center hub 15 into the center hole 2 in the first disc 1. In this manner, the clamper 17 is drawn from the rotary shaft 5 to allow the first disc 1 to be freely removable from the first turntable 6.

Figure 12:
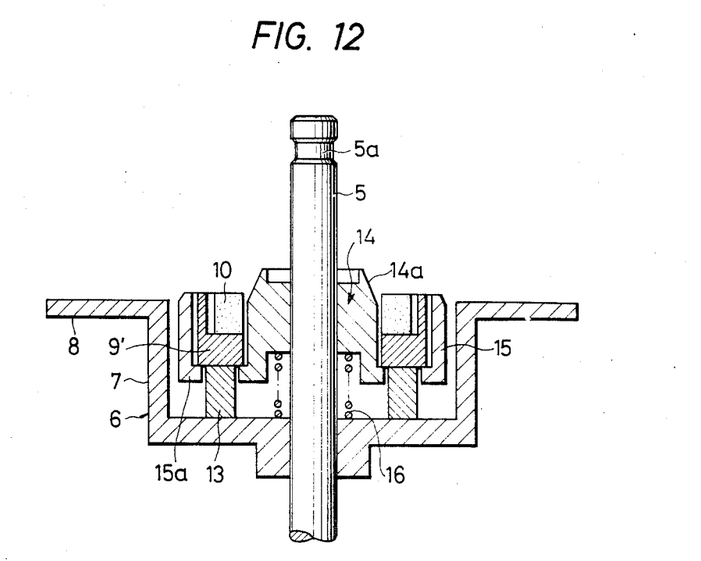
FIG. 12 is a cross-sectional view showing an alternative structure of the turntable device shown in FIG. 3.

The second turntable 12 can be modified as shown in FIG. 12. In this modification, the yoke 9' is formed with an upwardly extending annularly shaped portion surrounding the magnet. In this case, the rubber washer 11 employed in the previously described embodiments can be omitted.

Figure 13:
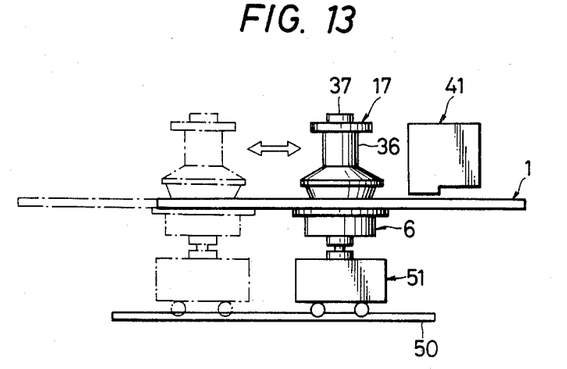
FIGS. 13 and 14 show schematically playback apparatuses in which the present invention may be employed.
Figure 14:
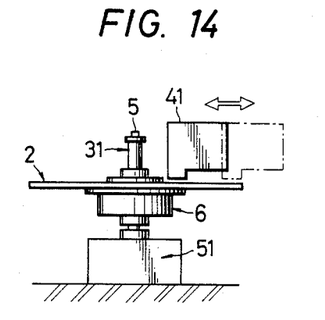

FIGS. 13 and 14 depict schematically two different ways in which the disc mounting mechanism of the present invention can be employed to reproduce recorded discs. In the arrangement of FIG. 13 in which, for instance, a video disc 1 is to be reproduced, a motor unit 51 is mounted in rails 50, on which it can be moved back and forth. The disc 1 is mounted to the motor unit 51 as depicted in FIG. 11. A pickup head 41 is stationarily mounted. For reproduction, the motor unit 51 is moved on the rails 50 while the motor unit rotates the disc 1 so as to cause the pickup head to follow the recorded track on the disc.

In the arrangement of FIG. 14, a disc 2, for example, an audio disc, is mounted using the clamper 31 shown in FIG. 5. Here, the pickup head is moved radially of the disc while the disc is being rotated by the motor unit 51 to follow the recorded track on the disc.

Figure 6:
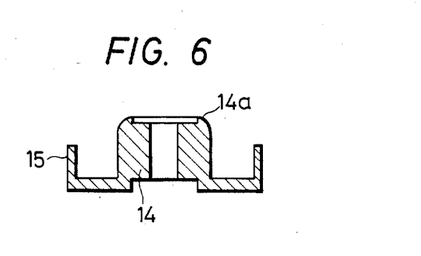
FIGS. 6 and 7 show an alternate form of a first turntable.
Figure 7:
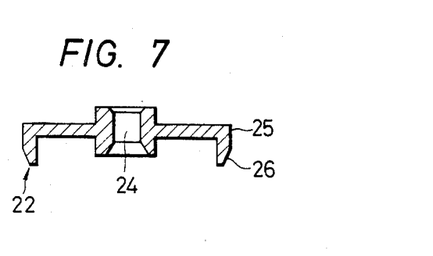
Figure 8:
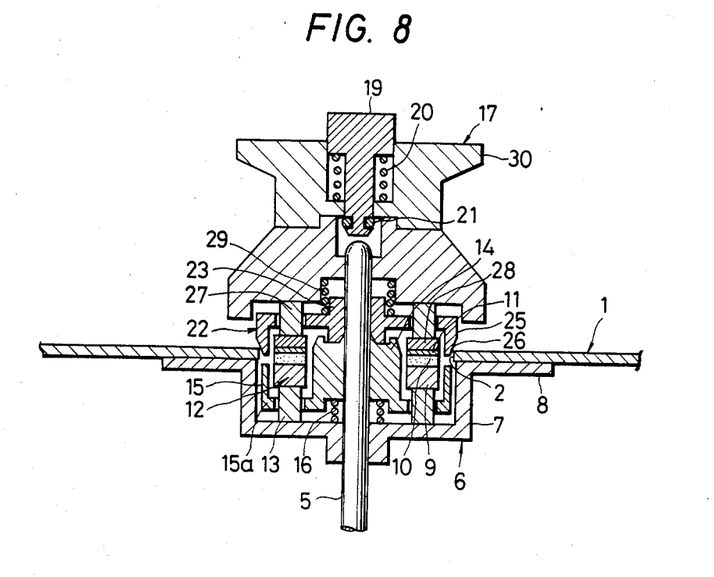
FIGS. 8 and 9 are cross-sectional views illustrating the manner in which a disc is mounted using the disc mounting mechanism of FIGS. 1 and 2.
Figure 9:
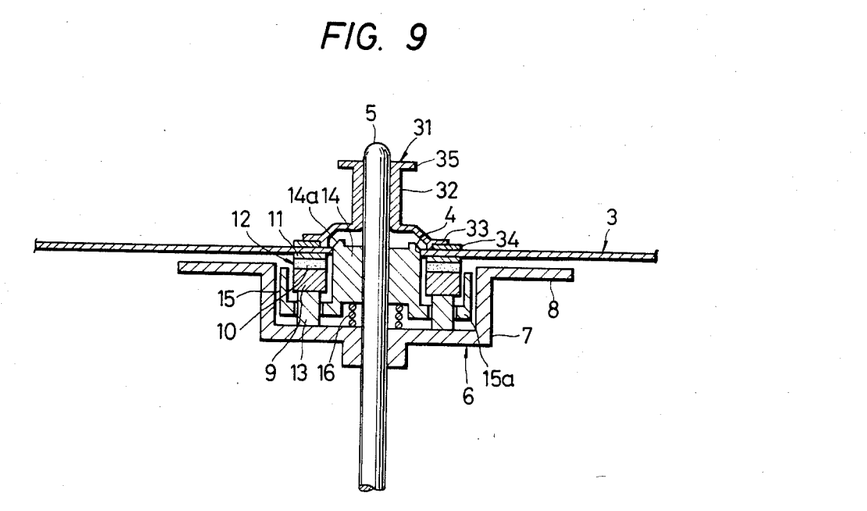

As described above, the first and second disc locating members 14 and 22 employ as the inclined surfaces 14a and 26 conical surfaces to be fitted into the center bores 2 and 4 of the first and second discs 1 and 3; however, the first and second disc locating member may be configurated to provide spherical surfaces, each of a diameter greater than that of the center holes 2 and 4 as shown in FIGS. 6 and 7 while producing the same effect as before.

As set forth hereinbefore, according to the present invention, there is provided the first disc locating member 22 removably arranged on the spindle 5 for rotating and driving the first disc 1 with the larger center hole 2 and the second disc 3 with the smaller center hole 4. The first disc locating member is dimensioned to provide circular across sections, successively smaller to the bottom end thereof. The second disc locating member is slidably mounted on the rotary shaft 5 and dimensioned to provide circular cross sections successively larger toward the top thereof. The first turntable 6 is fixed to the spindle 5, and the second turntable 12, of a diameter less than that of the first turntable 6, is located on a level different therefrom. The first turntable 6 is employed for mounting the first disc 1, and the second disc locating member 12 is used for mounting the second disc 3.

This arrangement involves results and effects as follows:

(1) A unitary rotary drive member is capable of selectively mounting the first and second discs 1 and 3 with different center bores 2 and 4, respectively.

(2) The first and second discs may be mounted without any eccentricity and with the tops thereof at the same level. (3) Loose mounting is eliminated by rigidly mounting both of the first and second turntables 6 and 12 on the spindle 5. (4) The mechanism is compact as a whole.

This completes the description of the preferred embodiments of the present invention. Although preferred embodiments have been described, it is believed that numerous modifications and alterations thereto would be apparent to one of ordinary skill in the art without departing from the spirit and scope of the invention.

I claim:

1. A disc mounting mechanism capable of mounting first and second discs having different center hole diameters to a rotated shaft, the diameter of the center hole of said first disc being greater than the diameter of the center hole of said second disc, comprising: first and second turntables mounted concentrically on said rotated shaft for rotation with said rotated shaft, said turntables being concentric with respect to one another with said first turntable surrounding said second turntable; first disc locating means, said first disc locating means having first and second cylindrical portions having outer diameters corresponding to diameters of center holes in said first and second discs, respectively, said first cylindrical portion being located between said first and second turntables and said second cylindrical portion being inside said second turntable, said first disc locating member being slidable axially with respect to said first and second turntables parallel to said rotated shaft; and first and second clamping members for clamping said first and second discs to said first and second turntables, respectively, said first and second clamping members being slidably mountable on said rotated shaft, said first clamping member comprising means for depressing said first disc locating means to move said first cylindrical portion below a surface of said first disc when said first disc is clamped to said first turntable by said first clamping member.

2. The disc mounting mechanism of claim 1, wherein said first turntable comprises a bottomed cylindrical member having a bottom fixed to said rotated shaft and an upper flange portion on which said first disc rests when said first disc is clamped to said first turntable.

3. The disc mounting mechanism of claim 2, wherein said second turntable projects upwardly from said bottom of said first turntable.

4. The disc mounting mechanism of claim 3, wherein said second turntable comprises an annularly shaped spacer fixed to said bottom of said first turntable, an annularly shaped yoke fixed to an upper surface of said spacer, and a annularly shaped magnet fixed to said yoke.

5. The disc mounting mechanism of claim 4, wherein said spacer has a plurality of holes formed therein, and wherein said first disc locating member comprises a plurality of connectors connecting said first and second cylindrical portions, said connectors extending through respective ones of said holes in said spacer, and a spring for biasing said first disc locating member upwardly.

6. The disc mounting mechanism of claim 5, wherein said second turntable further comprises a resilient washer fixed to an upper surface of said magnet.

7. The disc mounting mechanism of claim 5, wherein said yoke is generally cup shaped, having an upper lip extending substantially to a level of an upper surface of said magnet.

8. The disc mounting mechanism of claim 1, wherein said first and second cylindrical portions have tapered outer upper edges.

9. The disc mounting mechanism of claim 1, wherein said first clamping member comprises: a generally cylindrical body having an axially extending hole therein; second disc locating means, said second disc locating means having a disc-shaped portion having a center hole therein aligned with said hole in said cylindrical body and a cylindrical portion surrounding said disc-shaped portion, said disc-shaped portion having a plurality of holes therein receiving spacers extending from a lower surface of said cylindrical body; at least one magnetic body fixed to a lower surface of said spacers and preventing withdrawal of said second disc locating means from said spacers; a spring urging said second disc locating means away from said cylindrical body; a movable body slidably disposed in an upper portion of said axially extending hole in said cylindrical body; and a spring for urging said movable body upwardly; and retainer means for preventing withdrawal of said movable body from said axially extending hole in said cylindrical body; and wherein said depressing means comprises a sleeve portion of said second disc locating means.

10. The disc mounting mechanism of claim 9, wherein said first clamping member further comprises a slide member slidably mounted in an axial passage in said movable member, a spring for urging said slide member downwardly, and a plurality of balls slidably fitted into respective radial holes formed in said movable member generally below said slide member and engageable with an annualar groove formed in an upper end of said rotated shaft.

11. The disc mounting mechanism of claim 9, wherein said cylindrical portion of said second disc locating member has a tapered outer lower edge.

12. The disc mounting mechanism of claim 9, wherein said cylindrical body comprises a thumb segment.

13. The disc mounting mechanism of claim 1, wherein said second clamping member comprises a spindle sleeve having a thumb segment at an upper end thereof and a flared portion at a lower end thereof, and an annular magnet plate fixed to said flared portion.

* * * * *